(12) United States Patent
Fischer et al.

(10) Patent No.: US 6,727,615 B2
(45) Date of Patent: Apr. 27, 2004

(54) ELECTRIC DRIVE UNIT WITH A CYLINDRICAL BEARING INDENTED IN THE HOUSING

(75) Inventors: Ernst Fischer, Gernsbach (DE); Richard Hurst, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/223,725

(22) Filed: Aug. 20, 2002

(65) Prior Publication Data

US 2003/0034706 A1 Feb. 20, 2003

Related U.S. Application Data

(63) Continuation-in-part of application No. 09/254,067, filed on Apr. 30, 1999, now abandoned.

(30) Foreign Application Priority Data

Apr. 30, 1998 (DE) ............................... PCT/DE98/01201
Dec. 2, 2002 (DE) .......................................... 100 60 089

(51) Int. Cl.$^7$ ............................... H02K 5/16; F16C 35/02
(52) U.S. Cl. ........................ 310/90; 384/204; 384/450
(58) Field of Search .......................... 310/90; 384/450, 384/204, 462, 371; 29/596, 598

(56) References Cited

U.S. PATENT DOCUMENTS 4,767,677 A * 8/1988 Kuwayama ................. 428/551
4,920,289 A * 4/1990 Saito ............................ 310/90
5,053,661 A * 10/1991 Kitamura et al. ............. 310/83
5,129,740 A   7/1992 Matsushita et al. ......... 384/441
5,164,256 A * 11/1992 Sato et al. ............... 428/304.4
5,175,464 A * 12/1992 Smith ......................... 310/239
5,271,607 A * 12/1993 Kubota et al. .............. 384/438
5,291,088 A *  3/1994 Adam et al. .................. 310/88
5,506,461 A *  4/1996 Okabe ........................ 310/239
6,163,096 A * 12/2000 Michenfelder et al. ...... 310/239

FOREIGN PATENT DOCUMENTS

EP          0485001 A2 *  5/1992

* cited by examiner

Primary Examiner—Burton S. Mullins
Assistant Examiner—J. Aguirrechea
(74) Attorney, Agent, or Firm—Ronald E. Greigg

(57) ABSTRACT

An electric drive unit for windshield wipers of a motor vehicle, including a drive motor having an armature accommodated in a substantially cup-shaped pole housing, a substantially cup-shaped gearbox, secured on a face end to the pole housing, for receiving gear elements that convert the rotation of an armature shaft of the armature, supported on one end in the pole housing and on the other end in the gearbox. The armature shaft, adjacent to a bottom of the pole housing, is supported in a cylinder bearing mounted with a press-fit, whose outer diameter is greater than or equal to three times a length of the cylinder bearing.

8 Claims, 1 Drawing Sheet

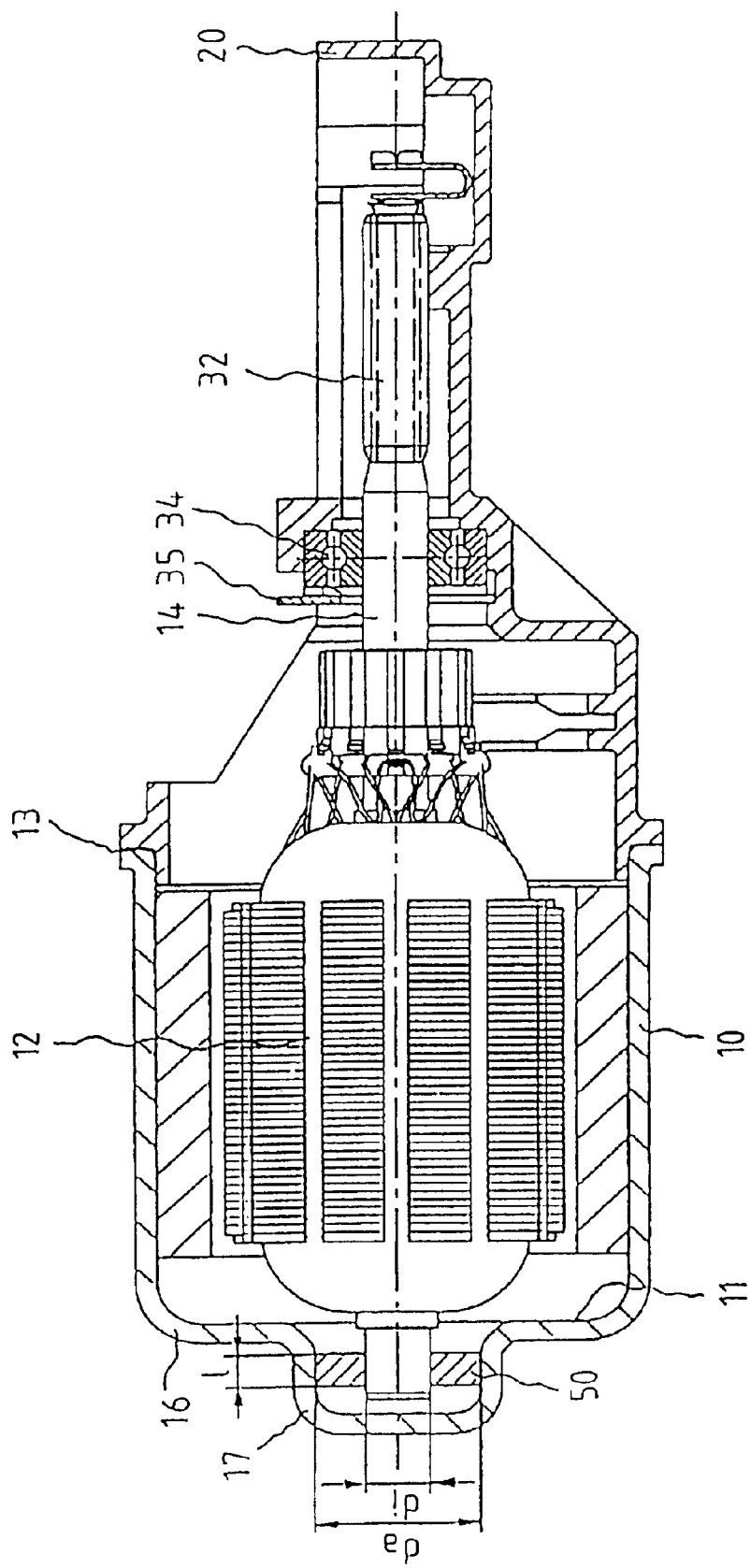
The Figure

ELECTRIC DRIVE UNIT WITH A CYLINDRICAL BEARING INDENTED IN THE HOUSING

CROSS REFERENCE TO RELATED APPLICATIONS

This application is a continuation-in-part of application Ser. No. 09/254,067, filed Apr. 30, 1999, now abandoned.

BACKGROUND OF THE INVENTION

The invention relates to an electric drive unit, in particular for windshield wipers of a motor vehicle, including a drive motor having an armature accommodated in a substantially cup-shaped pole housing, having a substantially cup-shaped gearbox, secured on its face end to the pole housing, for receiving gear elements that convert the rotation of an armature shaft of the armature, supported on one end in the pole housing and on the other in the gearbox.

One such drive unit is known for instance from German Patent Disclosures IDE 32 20 191 A1, DE 32 35 622 A1, and IDE 41 16 100 A1, and from German Patent DE 39 30 144 C2.

In these known drive units, to support the armature shaft in the pole housing a spherical cap bearing of a sintered metal is used, which is fixed in the pole housing in an indentation by means of a spring washer adapted to the bearing. Because the spherical cap can rotate, slightly skewed positions of the armature do not disadvantageously affect the running properties of the drive unit.

One problem in such a drive unit is the complicated assembly of the spherical cap bearing, which requires additional securing elements in the form of spring washers or the like. It is therefore the object of the invention to refine an electric drive unit, in particular for windshield wipers of a motor vehicle, of the above-defined generic type in such a way that simple mounting of the armature shaft in the pole housing with as few parts as possible, and consequently also the simplest possible assembly of the drive unit, are made possible.

BRIEF SUMMARY OF THE INVENTION

The objects of the invention are attained in an electric drive unit of the type described at the outset, according to the invention in that the armature shaft, adjacent to a bottom of the pole housing, is supported in a cylindrical bearing mounted in the pole housing with a press-fit, wherein the outer diameter of the bearing is greater than or equal to three times its length.

In this invention, a cylindrical bearing is mounted by a press fit, wherein the outer diameter of the bearing is just slightly greater than the space in which it fits, so that the bearing must be pressed into place. This cylindrical bearing supports the armature shaft in the pole housing. Further, the outer diameter of the cylindrical bearing is greater than or equal to three times its length. This has the especially great advantage that because of the press fit of the bearing, wherein the bearing has a slightly greater external diameter than the space into which it fits, additional securing elements, such as spring washers and the like, can be dispensed with. Because the outer diameter is greater than or equal to three times the bearing length, virtually no reduction in the inside diameter occurs during mounting of the cylinder bearing by a press fit. Also because the outside diameter of the bearing is substantially greater than its length, even slightly skewed positions of the armature shaft do not have a disadvantageous effect on the running properties of the overall drive unit.

A cylinder bearing with such dimensions also makes a compact structure possible, that is, a reduction in installation space and in particular a shortening of installation space both for the pole housing and the armature shaft, and this makes it possible to economize on material.

Purely in principle, the cylinder bearing can be secured in the most various ways in the pole housing. For instance, special bearing receptacles may be provided in the pole housing.

An especially advantageous embodiment provides that the cylindrical bearing is disposed in an indentation embodied in the pole housing bottom. This indentation may be produced advantageously in the pole housing, which is usually made as a deep-drawn part.

Since moreover a large bearing seat diameter for the cylinder bearing is necessary in the pole housing, it is assured that the armature winding of the drive motor, because of the large-diameter indentation necessary for such a large bearing seat diameter, cannot collide with the pole housing bottom, and thus in this sense a compact design of both motor and pole housing is possible.

It is also advantageously provided that the body of the cylinder bearing acts as a lubricant repository. Once again, it is especially advantageous that the outer diameter of the cylinder bearing is substantially greater than its length. Because of the large outer diameter of the bearing, an adequate pore volume in the body of the cylinder bearing, which acts as a lubricant repository, is thus created with a short bearing length.

BRIEF DESCRIPTION OF THE DRAWING

Further characteristics and advantages of the invention are the subject of the ensuing description and of the drawing showing an exemplary embodiment. In The FIGURE, a partly cutaway side view of an electric drive unit according to the invention is shown with the gearbox cover removed.

DETAILED DESCRIPTION OF THE INVENTION

An electric drive unit, shown in the drawing, for windshield wipers of a motor vehicle includes a cup-shaped pole housing 10, in which an electric armature 12, known per se, is accommodated.

A substantially also cup-shaped gearbox 20 is secured by its face end to a flange 13 of the pole housing 10 and serves to receive a transmission gear wheel, which meshes with a worm 32 connected to an armature shaft 14 of the armature 12. The armature shaft 14 is supported in the gearbox 20 in a ball bearing 34, which is axially secured in the gearbox 20 by a retaining bracket 35.

The side surfaces of the Dole housing 10 curve as shown at 16 to form a pole housing bottom 11. The armature shaft is supported, on its side remote from the gearbox 20, in an indentation 17 embodied in the bottom 11 of the pole housing 10, by means of a cylindrical bearing 50 mounted with a press fit. The press fit is achieved by providing that the outer diameter of the bearing has a slightly greater starting diameter than the inside diameter of the indentation 17 in which it fits. The outer diameter $d_a$ of the cylindrical bearing 50 is also made to be greater than or equal to three times its length l. The cylindrical bearing 50 itself is of a sintered metal. The toroidal or annular body of the cylindrical bearing 50 forms a lubricant repository.

Because of the large outer diameter $d_a$ of the cylindrical bearing 50, which is substantially greater than its length l, a reduction in diameter of the inside diameter $d_i$, corresponding to the outer diameter of the armature shaft 14, upon mounting of the cylindrical bearing 50 with a press fit is avoided. Without this elimination of the reduction of the inside diameter of the bearing, mounting of the armature shaft 14 is made more difficult or even impossible.

The large outer diameter $d_a$ of the press-fitted cylinder bearing 50 in particular also makes possible an adequate pore volume for the lubricant, thus assuring good lubrication of the cylinder bearing over a long period of time.

Because of the short length l of the cylindrical bearing 50, slightly skewed positions of the armature shaft 14 are not deleterious to the operation of the drive unit, because as a result of the shortness of the cylindrical bearing 50, torsion of the armature shaft 14 in the cylindrical bearing 50 is practically precluded.

Since the cylindrical bearing 50 is mounted with a press fit, by means of the bearing 50 having a slightly greater outside diameter $d_a$ than the inside diameter of the indentation 17 of the pole housing 10, additional securing elements, such as spring washers or the like, can also be dispensed with, so that the mounting of the cylindrical bearing 50 and thus of the entire drive unit is made substantially simpler.

The forgoing relates to preferred exemplary embodiments of the invention, it being understood that other variants and embodiments thereof are possible within the spirit and scope of the invention, the latter being defined by the appended claims.

We claim:

1. An electric drive unit for windshield wipers of a motor vehicle, comprising a drive motor having an armature (12) accommodated in a substantially cup-shaped pole housing (10), a substantially cup-shaped gearbox (20), secured on a face end of the pole housing (10), for receiving gear elements that convert a rotation of an armature shaft (14) of the armature (12), said armature shaft (14) is supported on one end in the pole housing (10) and on another other end in the gearbox (20), the armature shaft (14), adjacent to a bottom (11) of the pole housing, is supported in a cylindrical bearing (50) mounted with a press-fit, whose outer diameter ($d_a$) is greater than or equal to three times a length (l) of the cylindrical bearing, said cylindrical bearing (50) is disposed in an indentation (17) embodied in the pole housing bottom (11), which indentation has an inner end surface, and, prior to being installed, the outer diameter ($d_a$) of the cylindrical bearing (50) is greater than an inner diameter of the indentation, and after insertion the cylindrical bearing (50) does not touch the inner end surface of the indentation.

2. The drive unit according to claim 1, in which the cylinder bearing (50) comprises sintered metal.

3. The drive unit according to claim 2, in which the body of the cylindrical bearing (50) acts as a lubricant repository.

4. The drive unit according to claim 1, in which the body of the cylinder bearing (50) acts as a lubricant repository.

5. An electric drive unit for windshield wipers of a motor vehicle, comprising a drive motor having an armature (12) accommodated in a substantially cup-shaped pole housing (10), a substantially cup-shaped gearbox (20), secured on a face end of the pole housing (10), for receiving gear elements that convert a rotation of an armature shaft (14) of the armature (12), said armature shaft (14) is supported on one end in the pole housing (10) and on another other end in the gearbox (20), the armature shaft (14), adjacent to a bottom (11) of the pole housing, is supported in a cylindrical bearing (50) mounted with a press-fit, whose outer diameter ($d_a$) is greater than or equal to three times a length (l) of the cylindrical bearing, said cylindrical bearing (50) is disposed in an indentation (17) embodied in the pole housing bottom (11), which indentation (17) has an inner end surface and the cylindrical bearing (50) is press fit into the indentation (17), and after insertion the cylindrical bearing (50) does not touch the inner end surface of the indentation.

6. The drive unit according to claim 5, in which the cylinder bearing (50) comprises sintered metal.

7. The drive unit according to claim 5, in which the body of the cylinder bearing (50) acts as a lubricant repository.

8. The drive unit according to claim 6, in which the body of the cylindrical bearing (50) acts as a lubricant repository.

* * * * *

UNITED STATES PATENT AND TRADEMARK OFFICE
CERTIFICATE OF CORRECTION

PATENT NO.     : 6,727,615 B2
DATED          : April 27, 2004
INVENTOR(S)    : Ernst Fischer and Richard Hurst It is certified that error appears in the above-identified patent and that said Letters Patent is hereby corrected as shown below:

<u>Title page,</u>
Item [30], please correct to read as follows:
-- [30]   Foreign Application Priority Data
Apr. 30, 1998   (DE) .................... PCT/DE 98/01201
June 26, 1997   (DE) .................... 197 27 120 --

Signed and Sealed this

Twenty-second Day of February, 2005

JON W. DUDAS
*Director of the United States Patent and Trademark Office*